United States Patent
Ostromuhov et al.

(10) Patent No.: US 6,778,865 B1
(45) Date of Patent: Aug. 17, 2004

(54) METHOD AND DEVICE FOR MONITORING AND CONTROLLING APPLIANCES AND INSTALLATIONS WITH A BI-OR MULTIFUNCTIONAL OPERATING RANGE

(75) Inventors: Leonid Ostromuhov, Kassel (DE); Jan Huijnk, Nymegan (NL); Herbert Bauer, Kassel (DE)

(73) Assignee: WINGAS GmbH, Kassel (DE)

( * ) Notice: Subject to any disclaimer, the term of this patent is extended or adjusted under 35 U.S.C. 154(b) by 0 days.

(21) Appl. No.: 09/926,200

(22) PCT Filed: Mar. 23, 2000

(86) PCT No.: PCT/EP00/02581
§ 371 (c)(1),
(2), (4) Date: Sep. 24, 2001

(87) PCT Pub. No.: WO00/58797
PCT Pub. Date: Oct. 5, 2000

(30) Foreign Application Priority Data

Mar. 25, 1999 (DE) .......................... 199 13 662

(51) Int. Cl.⁷ .............................................. G05B 13/03
(52) U.S. Cl. ............................ 700/53; 700/19; 700/17; 700/83; 700/34; 700/73; 700/74; 340/7.1; 340/7.51; 340/825.37; 340/825.19
(58) Field of Search ............................. 700/19, 20, 9, 700/17, 83, 34, 28, 26, 46, 67, 73, 74; 340/7.1, 7.51, 995, 825.37, 825.19

(56) References Cited

U.S. PATENT DOCUMENTS

| | | | |
|---|---|---|---|
| 3,994,623 A | | 11/1976 | Rutshtein et al. |
| 5,084,825 A | | 1/1992 | Kelly et al. |
| 5,454,510 A | * | 10/1995 | Manson et al. ............ 236/46 R |
| 5,570,838 A | | 11/1996 | Davis, Jr. et al. |
| 5,699,267 A | | 12/1997 | Batson et al. |
| 5,713,332 A | | 2/1998 | Adler et al. |
| 5,731,997 A | * | 3/1998 | Manson et al. ............. 702/150 |
| 5,857,161 A | | 1/1999 | Zeilinger et al. |
| 6,001,065 A | * | 12/1999 | DeVito ....................... 600/544 |
| 6,115,713 A | * | 9/2000 | Pascucci et al. .............. 707/10 |
| 6,148,615 A | | 11/2000 | Vogt et al. |
| 6,254,536 B1 | * | 7/2001 | DeVito ....................... 600/300 |
| 6,360,021 B1 | * | 3/2002 | McCarthy et al. .......... 382/254 |
| 6,389,464 B1 | * | 5/2002 | Krishnamurthy et al. ... 709/220 |
| 2003/0011467 A1 | * | 1/2003 | Suomela ...................... 340/7.1 |

FOREIGN PATENT DOCUMENTS

| | | |
|---|---|---|
| DE | 44 18 731 | 11/1995 |
| DE | 195 24 914 | 1/1997 |
| DE | 198 12 843 | 9/1999 |
| EP | 0 332 888 | 9/1989 |

\* cited by examiner

Primary Examiner—Ramesh Patel
(74) Attorney, Agent, or Firm—Oblon, Spivak, McClelland, Maier & Neustadt, P.C.

(57) ABSTRACT

A Method and apparatus for monitoring and controlling appliances and systems having a two-dimensional or multidimensional operating envelope. A map of the operating envelope or of a part of it onto a unit domain or the operating envelope of another appliance is used for monitoring and control. The apparatus produces this map. The method and the apparatus allow monitoring and control which can be carried out substantially in the same way for appliances whose operating envelopes have different shapes.

24 Claims, 5 Drawing Sheets

METHOD AND DEVICE FOR MONITORING AND CONTROLLING APPLIANCES AND INSTALLATIONS WITH A BI-OR MULTIFUNCTIONAL OPERATING RANGE

The invention relates to a method and an apparatus for monitoring and controlling an appliance or a system comprising a number of appliances, having a two-dimensional or multidimensional operating envelope, whose limits represent different technical, procedure, financial or contractual restrictions.

One example of an appliance having a two-dimensional (planar) operating envelope, which is referred to as an operating characteristic, is a compressor. The gas volume flow V and the enthalpy difference H are chosen, for example, as characteristic variables for the operating point of a compressor. These characteristic variables are used as co-ordinate axes for representing the operating characteristic, which is defined as the totality of all those points (operating points) at which the compressor may be operated in the V'H plane. In practice, the operating characteristic is mainly in the form of a curved polygon. The sides of the polygon are referred to as bounds whose infringement results in certain secondary conditions no longer being satisfied. One of the bounds is, for example, the pump bound, which defines a minimum gas volume flow at which there is still protection against pump surges; beyond the pump bound, operation of the compressor becomes unstable. Further bounds correspond to the maximum rating of the compressor drive, the maximum flow rate, and the minimum and the maximum rotation speed.

The monitoring of a compressor has two tasks:

1. Preventative monitoring, to protect the equipment against dangerous and unstable operating conditions, for example protection against pump surging.

2. Functional monitoring in order, for example, to set a specific compressor rotation speed as a function of the operating state (for example the load), or to maintain a predetermined nominal value.

Known monitoring systems for compressors are based on the measurement of a number of characteristic variables for the compressors and their controllers. If the operating point infringes what is referred to as a control line, which runs parallel to a bound, and at a specific distance from it, in the operating characteristic, suitable measures are taken in order to return the operating point to an area on this side of the control line once again.

In EP-B-0 332 888, the rate of movement of the operating point in the direction of the pump limit in the operating characteristic is determined; if a pump control line, which occurs at a variable distance from the pump limit depending on the speed, is infringed, a blow-out or bypass valve is opened quickly, in addition to the normal blow-out control.

U.S. Pat. No. 3,994,623 discloses the linking of a number of originally independent control loops. A method is proposed which can be carried out using a cascade circuit. The method comprises the control loops for the rotation speed, the feed pressure and the gas volume flow being linked to one another, with the output signal from each outer loop representing the input signal for the next inner loop.

In known control methods, a separate control loop is provided for each of the control lines. If a control line is infringed, measures are taken, which depend on the respectively infringed control line and its specific shape. These methods are thus based on an independent description of each individual control line. If the operating point is in an area close to two bounds (a "corner" of the operating envelope), control of the operating point is very complicated. The control loops associated with the various bounds thus often operate independently of one another and conflict with one another, or else the interaction of the various control loops is incomplete.

Similar difficulties also occur when controlling other appliances or systems which comprise a number of appliances, having an operating envelope with two, three or more dimensions.

In the case of a three-dimensional operating envelope, the boundary conditions, which must not be infringed in either direction, are generally represented as, possibly curved, surfaces. The operating envelope is then an irregular polyhedron with curved side surfaces. If the operating point is in the vicinity of more than one of the side surfaces, this results in a complicated control response. In the general case of an N-dimensional operating envelope, the boundary conditions can generally be represented as, possibly curved, (N–1)-dimensional hyperplanes. In this case as well, particular control difficulties arise when the operating point approaches more than one of the hyperplanes.

A first object of the present invention is to provide a standard method for monitoring or controlling the position of the operating point in a two-dimensional or multidimensional operating envelope, which is independent of the specific shape of the operating envelope and which avoids said difficulties when the operating point approaches the limits of the operating envelope. The method is intended to allow the user to be warned reliably of unacceptable or dangerous operating conditions (monitoring), and to avoid them, or to maintain a predetermined nominal value (control).

This object is achieved by a method for monitoring or controlling an appliance or a system comprising a number of appliances, having a two-dimensional or multidimensional operating envelope, in which, according to the invention, the operating envelope, or a part of it, is mapped onto a unit domain or onto the operating envelope of another appliance for monitoring or control.

In this method, an operating point or set point in the operating envelope is advantageously transformed by means of the map to a point in the unit domain or in the operating envelope of the other appliance. The monitoring or control is in this case carried out on the basis of the position of the image of the operating point which results from the map.

The term unit domain in this case means intrinsically any desired region which is selected and is cohesive as an entity. For two-dimensional operating envelopes, for example, the unit circle or a half plane can advantageously be used as the unit domain. The unit sphere or a semi-infinite body advantageously carries out this role for operating envelopes with more dimensions.

If a map is made of the operating envelope onto a unit domain, the method according to the invention can be used to identify when the operating point is approaching a limit of the operating envelope, since the image of the operating point approaches a limit of the unit domain. One advantage of the method according to the invention is in this case that, provided the unit domain, the mapping rule and the co-ordinate representation of the image are selected appropriately, the situation where the image of the operating point is approaching a limit of the unit domain can be defined and controlled by monitoring a single limit.

A further advantage of the method according to the invention is that the monitoring of the operating point of different appliances can be carried out in a standard way by using differently shaped operating envelopes.

If the operating envelope of the appliance to be monitored is mapped onto the operating envelope of another appliance, the operating point of the appliance to be monitored can be monitored and controlled in the same way as for the other appliance. In particular, in this way, methods which have been proven for monitoring the operating point of a specific appliance can be transferred to the monitoring of the operating point of any other desired appliances with operating envelopes of any shape in the same dimension.

The method according to the invention is suitable for a large number of fields of application, in particular for monitoring a compressor.

In the method according to the invention, one or more process parameters are advantageously determined by means of the map, or the inverse transformation with respect to it.

In one advantageous refinement, the method for monitoring according to the invention contains the following steps:
 a) determination of the operating point in the operating envelope;
 b) transformation of the operating point by means of a stored map rule for the map;
 c) outputting the co-ordinates of the image of the operating point.

In one advantageous refinement, a control method according to the invention contains the following steps:
 a) determination of the operating point in the operating envelope;
 b) transformation of the operating point by means of a stored map rule for the map;
 c) comparison of the position of the image of the operating point with bounds, control lines or with the image of a set point in the image area;
 d) determination of control parameters which define a control action;
 e) carrying out the control action.

For a two-dimensional operating envelope, the method according to the invention can advantageously be implemented such that the map transforms a polygon, which is similar to the operating envelope, to a unit domain or an operating envelope of another appliance. The mapping can then advantageously be carried out by means of a function defined by the Christoffel-Schwarz integral. In this case, it is advantageous to approach the operating envelope from the inside. This means that the polygon which is similar to the operating envelope is located entirely in the interior of the operating envelope.

A further object of the invention is to provide an apparatus for carrying out the method for monitoring and control.

This object is achieved by an apparatus for monitoring or controlling an appliance or a system comprising a number of appliances having a two-dimensional or multidimensional operating envelope in which, according to the invention, means are provided for determining and storing parameters which are required to produce a map which maps the operating envelope, or a part of it, into a unit domain or into the operating envelope of another appliance.

The apparatus advantageously furthermore contains means for producing the map for any desired point in the operating envelope.

Furthermore, it is advantageous for the apparatus to contain means for comparing images of two points located in the operating envelope, with the comparison being carried out in the unit domain or in the operating envelope of the other appliance.

In a further advantageous refinement, the apparatus contains means for comparing an image of a point which is located in the operating envelope with at least one line (in particular a control line or bound) in the unit domain or in the operating envelope of the other appliance.

Furthermore, the apparatus may contain means for determining one or more process parameters by means of the map of the operating envelope onto the unit domain or onto the operating envelope of the other appliance.

An apparatus just for monitoring the operating point of an appliance or of a system comprising a number of appliances in this case advantageously contains the following parts:
 a) means for determining the operating point of the appliance or of the system comprising a number of appliances;
 b) means for producing a map of the operating point, which maps the operating envelope or a part of the operating envelope onto a unit domain or the operating envelope of another appliance;
 c) means for outputting the co-ordinates of the image of the operating point.

An apparatus for controlling an appliance or a system comprising a number of appliances can advantageously contain the following parts:
 a) means for determining the operating point of the appliance or of the system comprising a number of appliances;
 b) means for producing a map of the operating point, which maps the operating envelope or a part of the operating envelope onto a unit domain or the operating envelope of another appliance;
 c) means for determining parameters which define a control action;
 d) means for carrying out the control action.

Finally, an advantageous refinement of an apparatus for control may contain the following parts:
 a) a first computation model for transformation of a set point to a point in the unit domain or in the operating envelope of the other appliance;
 b) a measuring unit for determining the position of the operating point;
 c) a second computation module for transformation of the operating point to a point in the unit domain or of the operating envelope of the other appliance;
 d) a comparison unit, which compares the transformed operating point with the transformed set point or with at least one bound or control line of the transformed operating envelope;
 e) a monitoring unit for determining the parameters required for control,
 f) and an execution unit for carrying out the operations required for control.

In this case, the first and second computation models may also be identical; in this case, the (single) computation module transforms both the set point and the operating point.

A method according to the invention for monitoring and controlling the position of the operating point, and the principles required to understand this method, will be explained in more detail in the following text.

From the mathematical point of view, an operating envelope is generally represented by a integral cohesive region. It is then always possible to produce a continuous map, which can be differentiated and is reciprocal, of the operating envelope onto the interior of a unit domain (that is to say of another integral cohesive region).

Furthermore, mapping of the operating envelope onto a unit domain, and subsequent mapping of the unit domain onto the operating envelope of another appliance, in principle allows any N-dimensional operating envelope to be mapped onto an N-dimensional operating envelope of another appliance.

Particularly in the case of two-dimensional operating envelope, the co-ordinate axes may be regarded as the real and imaginary axes in the complex number plane. Riemann's mapping rule for complex analysis then ensures that a unique (reciprocal) and conformal map onto the interior of the unit circle exists for each integral cohesive region.

In order to carry out the monitoring and control method, a mapping rule for mapping the operating envelope or a part of it onto a unit domain or the operating envelope of another appliance is first of all stored in some suitable form.

The stored mapping rule may, for example, be a computation rule for calculating the image of each point within the operating envelope, or a part of it. In the simplest case, this computation rule is an analytical formula or an approximation formula for the map. Alternatively, the mapping rule may, for example, comprise a table which contains the associated image points for selected points in the operating envelope (original image point), possibly together with an interpolation rule on the procedure to be adopted for intermediate points in the operating envelope.

The stored mapping rule depends on the specific shape of the operating envelope, and is characteristic of the appliance to be controlled. Generally, the storage process is carried out only once for a specific appliance, provided the appliance characteristics do not change (for example due to ageing).

For the actual monitoring procedure, the operating point is first of all determined in the operating envelope. This step is expediently carried out by means of measuring appliances which are suitable for detecting the characteristic variables of the appliance to be controlled. The measured values are converted to co-ordinate values in the operating envelope. The operating point then consists of a set of N co-ordinate values, corresponding to the N dimensions of the operating envelope. In the next step, the operating point is mapped by means of the stored mapping rule. The image of the operating point is now in the form of a set of N values of transformed co-ordinates, which no longer need to correspond directly to the characteristic variables of the appliance to be monitored.

In the next step, comparisons are carried out on the basis of the position of the image of the operating point. To this end, for example, the position of the image of the operating point is determined with respect to the boundary of the image area. Alternatively, or additionally, the position of the image of the operating point can be compared with the position of the image of a set operating point, in which case the set operating point may be defined once or may be continuously matched to the operating requirements. It is likewise possible for the rate at which the image of the operating point is approaching the limit of the image area, or the image of the set operating point, to be determined as well.

Suitable control parameters are defined on the basis of such information. This may be done, for example, by first of all determining the direction, in the transformed co-ordinates, in which the image of the operating point is intended to be moved within the image area as a result of the control action. This direction may be, for example, the direction vector from the image of the operating point to the image of the set operating point, or a normal vector, pointing into the interior of the image area, on the boundary of the image area.

Now, firstly, the direction vector just determined can be transformed by means of the map which is in the inverse of the stored mapping rule to the co-ordinates of the original operating envelope, and a specific control action can be defined from the resultant original image of the direction vector. In this case, the inverse mapping process can be carried out, in a similar way to the original mapping process, by means of a computation rule or a table from original image and image points or from original image and image vectors. If the inverse mapping process is carried out by means of a table, then this table may be the same as that which was used for the original mapping of the operating point.

On the other hand, the determined direction vector in transformed co-ordinates can instead of this be used directly for defining the parameters for the specific control action. It is advantageous for this purpose for a table to have previously been defined in which the movement direction of the image of the operating point to be expected in the transformed co-ordinates has been entered for specific control actions, which are to be carried out once. Suitable control actions for recording in such a table are, in particular, those actions during which only a single operating parameter is changed. A specific control action, which may comprise the changing of a number of operating parameters, can then be defined by means of this table.

Finally, in the last step of the proposed method, the control action defined in this way is carried out on the basis of the determined control parameters.

Furthermore, an apparatus for monitoring the operating point according to the invention will now be described in more detail.

First of all, this apparatus contains means for determining the operating point. These means may be, for example, measuring appliances which, at their output, produce a signal which represents a unique measure of the value of a characteristic variable. The signals produced by the measuring appliances thus represent the operating point.

Furthermore, the apparatus contains means for producing the map of the operating point. These means may, for example, comprise an analogue/digital converter, a computation unit and a memory unit. The analogue/digital converters convert the signals which represent the operating point to a corresponding digital value. The operating point is now represented by N digital values.

A computation unit uses these values and a mapping rule which is stored in a memory unit to produce new digital values, which represent the co-ordinates of the image of the operating point in the unit domain. The mapping rule may in this case be located in the memory unit, for example in the form of a computation rule, or may be in the form of a table with an interpolation rule. Instead of being carried out digitally, the calculation can also be carried out by analogue means, without using analogue/digital converters. The means for producing the map of the operating point then contain an analogue computation device.

Finally, means are provided for outputting the co-ordinates of the operating point. These may be, for example, a screen for producing a graphic display of one or more co-ordinates of the image of the operating point, or digital/analogue converters with downstream display instruments.

An apparatus which is intended to be used not just for monitoring and displaying the operating point, but also for controlling it, contains further components.

Thus, furthermore, an apparatus such as this has means for determining the parameters which define a control action. These may comprise, for example, a computation unit, a memory unit and a digital/analogue converter. The computation unit uses the position of the image of the operating point in transformed co-ordinates to calculate the parameters which define a control action; in the process, it accesses computation rules stored in the memory unit, or tables for calculating these parameters. The digital/analogue converter converts these parameters into signal values. The means for carrying out the control action then use these signal values to directly influence the response of the appliance or of the system to be controlled.

Exemplary embodiments of the invention will be explained with reference to the attached drawings, in which.

EXAMPLE 1

Figure 1:
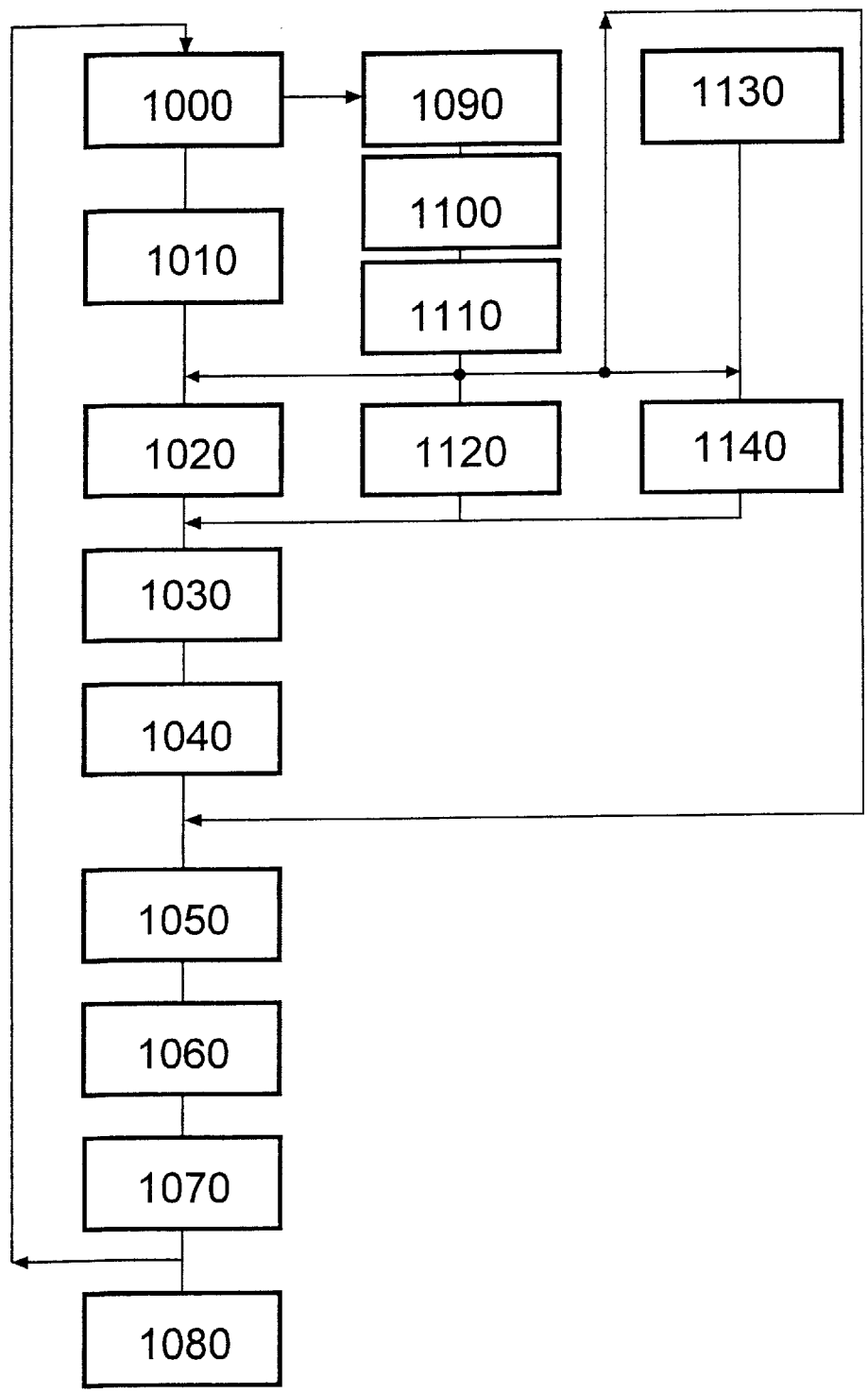
FIG. 1 shows an outline sketch of an apparatus for monitoring, for preventing the boundary of the characteristic from being infringed and for set value control of an appliance or of a system according to the present invention.

In this example, FIG. 1 will be used to explain an apparatus according to the invention for monitoring and for preventing infringement of the boundary of the characteristic of an appliance or of a system.

The controlled appliance 1000 in FIG. 1 is equipped with a unit 1090 for predetermining the operating envelope, with a unit 1100 for defining the forward and reverse transformation of the operating envelope and for determining the forward and reverse transformation parameters, and with a unit 1110 for storing the transformation rules, which are required in a unit 1120 for transformation of the operating envelope, with all its bounds, to a unit domain.

A measuring unit 1010 determines the position of the operating point (actual point). A functional unit 1020 transforms the operating point to a point in the unit domain. This unit 1020, if necessary, also determines parameters such as the rate and direction of movement of the operating point.

A comparison unit 1030 compares the transformed operating point with the bound or control line of the transformed operating envelope.

A further unit 1040 determines the control variables and the new position of the control lines in the transformed area. This unit determines the parameters required to carry out the control process, and the new position of the control line, for dynamic control systems as a function of the rate and direction of movement of the operating point.

The reverse transformation of the parameters for the control actions to be carried out takes place in a unit 1050. An execution unit 1060 in the control system carries out the control actions on the control members 1070.

The entire control process can be followed using an output and visualization unit 1080.

EXAMPLE 2

In this example, FIG. 1 will be used to explain a general description of an apparatus for set value control and for monitoring an appliance or a system, using the method according to the invention.

The units 1000 to 1120 in FIG. 1 are described in Example 1. The set value S is predetermined in an input unit 1130, and is transformed in a computation unit 1140 to a point in the unit domain.

The transformed set value is compared in the comparison unit 1030 with the transformed actual value, and with the control lines in the unit domain.

Before this comparison, the intervals between the actual value and the set value, the actual value and the control lines, and the set value and the control lines can be added or multiplied using appropriate penalty functions (D. Himmelblau, Applied Nonlinear Programming, McGraw-Hill Book Co., 1972, Part III, Chapter 7; N. Staroselsky and L. Ladin, More effective control for centrifugal gas compressors operating in parallel, Paper 86-GT-204, Am. Soc. Mec. Eng. 1986, page 7 and FIG. 8). The object of these functions is to weight the intervals depending on whether the actual value is relatively close to or well away from the control lines.

This provides an interaction between the set value control and the prevention of the infringement of the boundary of the characteristic as in Example 1.

EXAMPLE 3

This example describes an apparatus and a method according to the invention for checking, monitoring and controlling a compressor with a two-dimensional operating envelope.

Figure 2:
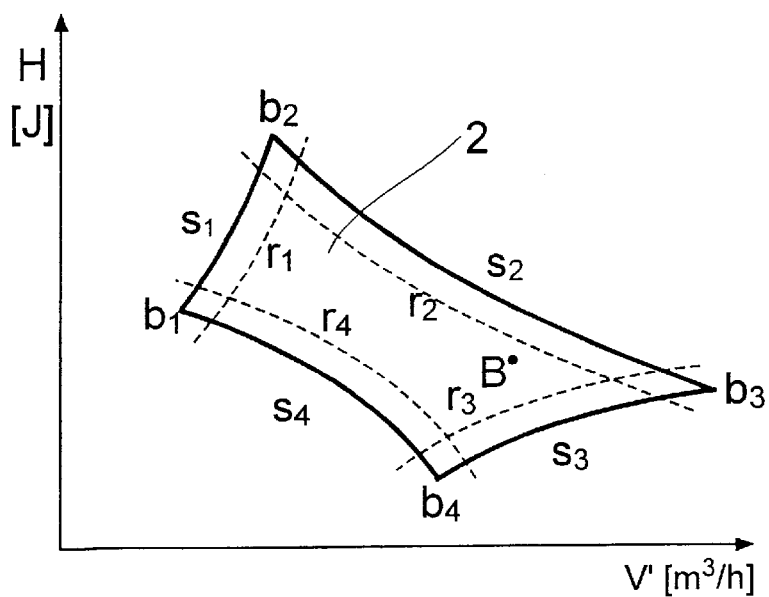
FIG. 2 shows the operating characteristic of a compressor.

FIG. 2 shows, schematically, a typical two-dimensional operating envelope for a compressor. This operating envelope is also referred to as the operating characteristic 2. The co-ordinates in this representation are the gas volume flow V' in $m^3/h$ and the enthalpy difference H in J. The pressure ratio $r=P_d/P_i$ often used instead of the enthalpy difference, with $P_i$ being the inlet pressure, and $P_d$ being the outlet pressure.

The operating characteristic 1 is bounded by the sides $s_1$ to $s_4$, which are referred to as the bounds. The side $s_i$ is the pump limit, beyond which the operation of the compressor becomes unstable. The side $s_2$ comprises the lowest values from two operating lines—the maximum drive power line and the maximum rotation speed line for the compressor. The side $s_3$ corresponds to the maximum possible feed rate, and the side $s_4$, corresponds to the operating line for the minimum compressor rotation speed. The corners of the characteristic, i.e. the intersections of the sides, are annotated $b_1$ to $b_4$. Furthermore, FIG. 2 shows the control lines $r_1$ to $r_4$, the operating point B and the set operating point S.

In conventional methods for compressor monitoring and control, the position of the operating point B with respect to one or more of the control lines is monitored separately for each control line.

Figure 3:
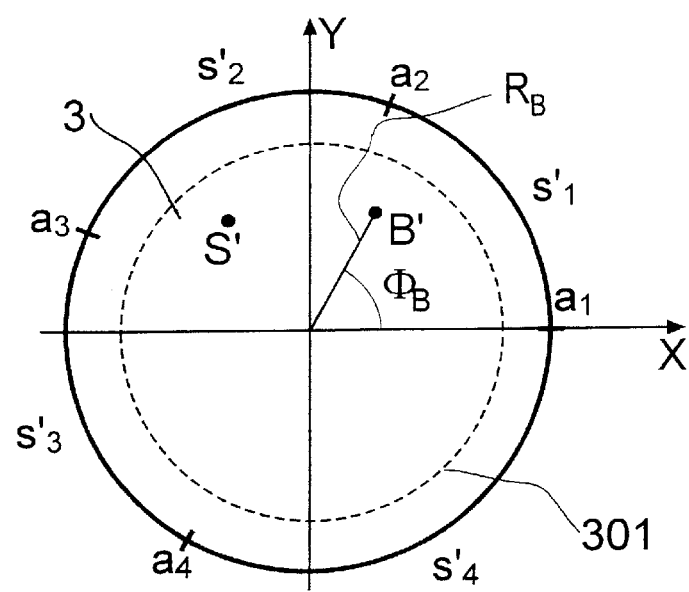
FIG. 3 shows the unit circle as a unit domain.

FIG. 3 shows, as the unit domain, the unit circle 3 with the radius $R_E=1$. A map, which maps the characteristic 1 from FIG. 2 onto the unit circle 3 in FIG. 3, is annotated $\psi_1$; it is assumed that this is known. The images of the corners $b_1$ to $b_4$ are annotated $a_1$ to $a_4$ ($a_i=\psi_1(b_i)$, i=1, ..., 4). The images of the bounds $s_1$ to $s_4$ are correspondingly annotated $s_1'$ to $s_4'$, and are in the form of circular arc sections. The image of the operating point under the map $\psi_1$ is annotated $B'=\psi_1(B)$, and the image of the set operating point is correspondingly annotated S'.

Figure 4:
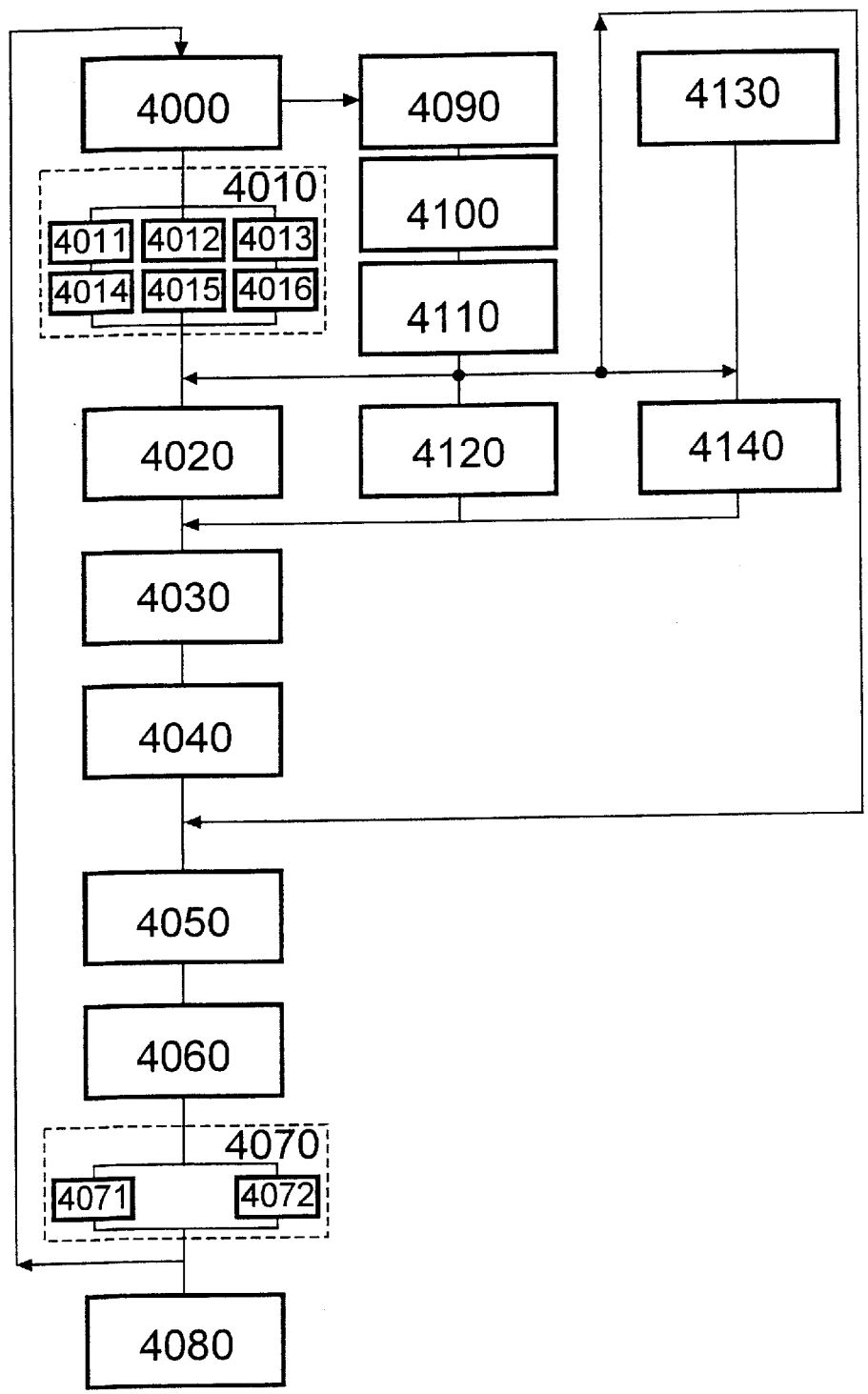
FIG. 4 shows an outline sketch of the monitoring of a compressor.

The procedure for monitoring and controlling the compressor using the method according to the invention will be explained with reference to FIG. 4. FIG. 4 shows, schematically, an apparatus for controlling a compressor 4000. The functions of the units 4000 to 4140 correspond to those of the units 1000 to 1140 in FIG. 1.

The measuring unit 4010 comprises a number of measuring instruments for the inlet pressure, the operating pressure, the gas volume flow etc., e.g. 4011, 4012 and 4013, and analogue-digital and digital-digital converters, for example 4014, 4015 and 4016.

The transformation rules are stored in the memory unit 4110 in the form of coefficients, computation processes etc., and a table, which associates the selected points in the operating envelope 2, shown in FIG. 2, with their image points in the unit circle 3 in FIG. 3. The operating point B is now monitored and controlled as follows:

The instantaneous values of the gas volume flow V' and of the pressure ratio r are determined using the measuring instruments mentioned above. The values of V' and r define the operating point B, and they are supplied to the computation unit 4020. The transformation rules stored in the memory unit 4110 and a table of original image and image points are used by the computation unit 4020 to calculate, the position of the image B' of the operating point in the unit circle 4. The co-ordinates of B' are, for example, in the form of polar co-ordinates $R_B$, $\phi_B$ at the output of the computation unit 4020.

In a similar way, the unit 4140 calculates the position of the image S' of the set point S, which is predetermined in 4130. Co-ordinates of S' are, for example, polar co-ordinates $R_S$, $\phi_S$.

Furthermore, the co-ordinates of the operating point B' and of the set point S' in the image area are supplied to the control unit 4030. The control unit compares the co-ordinates of the image of the operating point B'($R_B$, $\phi_B$) with the co-ordinates of the image of the previously defined set operating point S' ($R_S$, $\phi_S$, and with the control line 301 shown in FIG. 3, that is to say with its radius $R_R$.

The unit 4040 uses the result of this comparison to calculate a direction vector, along which the operating point will be moved.

In this case, the value $R_R$-$R_B$ directly indicates the distance between the image of the operating point and the control line in the unit circle, and, in a corresponding manner, 1-$R_B$, indicates the distance from the unit circle boundary. If $R_B$ is greater than a previously defined value $R_w$, then an audible warning signal can be emitted, which warns the operator of the compressor 4000 that the operating point is approaching a boundary of the operating envelope, in a dangerous manner.

Control variables for preventing the boundaries of the compressor characteristic from being infringed and for approaching the set value are determined in the unit 4040, analogously to the examples 1, 2.

If the actual point is in the vicinity of the control line or is approaching the control line too quickly, then the bypass valve opening position can be set, for example, in proportion to $|R_R$-$R_B|$.

If the actual point is in the vicinity of the set point, then the change in the compressor rotation speed can be set, for example, in proportion to |B'-S'|, in order to reach the set value.

In the situation where a rapid change in the actual value is intended and the distance between the operating value and the set value is large, and the compressor drive control is slow to react, the bypass value can also briefly be actuated.

The direction vector determined in 4040 is now mapped by the inverse transformation unit 4050 in a direction vector in the original characteristic 2. The inverse transformation unit 4050 for this purpose accesses the table of original image and image points stored in the memory unit 4110. Finally, the control unit 4040 calculates the desired position of the bypass valve 4071 and of the compressor rotation speed 4072 on the basis of the direction vector obtained in this way, in image and original image co-ordinates. The bypass valve 4071 and the compressor drive control 4072 are actuated by the calculated values by means of the execution device 4060. This actuation represents the actual control action.

The described compressor control method has at least two advantages over conventional methods. The first advantage is that the monitoring of the permissible operating conditions is carried out on the basis of a single bound, namely the unit circle line, and comprises monitoring of a single parameter, namely $R_B$. In a corresponding way, the control process for protection against unacceptable operating conditions is carried out on the basis of a single control line, namely the control line 301. The image of the characteristic, namely that of the unit circle, in this case has no corners. The known problems of controlling the operating point in the vicinity of corners of the characteristic therefore does not occur when using the described method.

The second advantage is that the calculation steps which are carried out in the control units 4030, 4040, 4050 are independent of the shape of the original operating characteristic. These calculation steps can thus be applied in this same way to a large number of appliances having different characteristics. Other steps than those described here are, of course, also feasible in this case. Thus, for example, the speed of the image of the operating point in transformed co-ordinates can also be used for control purposes.

EXAMPLE 4

Figure 5:
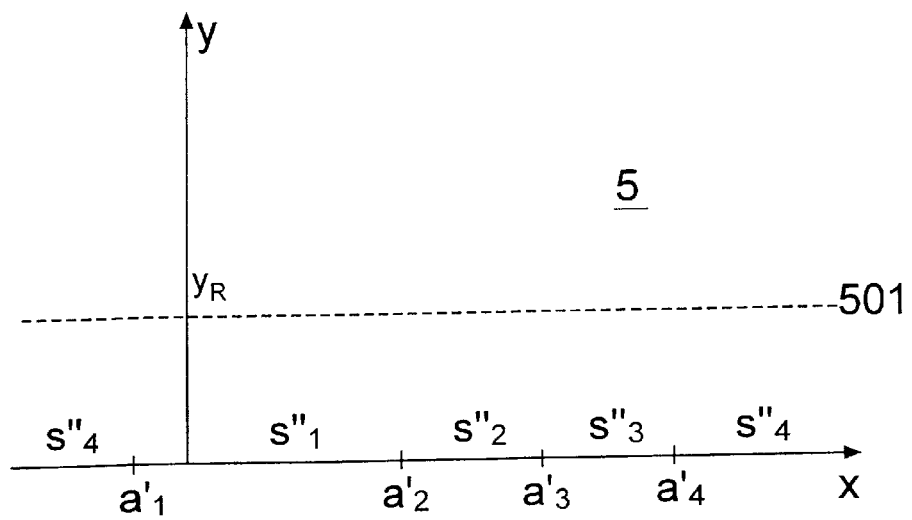
FIG. 5 shows the upper half-plane as a unit domain.

In this example, the method from Example 3 is modified such that the upper half plane is used as the unit domain rather than the unit circle. FIG. 5 shows the upper half plane 5. This is bounded at the bottom by the co-ordinate axis, which is annotated x. Once again, it is assumed that a map $\psi_2$ is known, which maps the characteristic 1 from FIG. 1 into the upper half plane 5. The images of the corners $b_1$ to $b_4$ are annotated $a_1'$ to $a_4'$ ($a_1'=\psi_2(b_i)$,i=1, . . . , 4) and the images of the bounds $s_1$ to $s_4$ are annotated $s_1''$ to $s_4''$. Furthermore, FIG. 5 shows a horizontally running control line 501, which intersects the co-ordinate axis, which is annotated y, at the point $y_R$. The compressor is once again monitored and controlled by means of an apparatus as shown in FIG. 4. The memory unit 4110 now contains a table, which associates the points in the operating characteristic 2 shown in FIG. 2 with image points in the upper half plane 5, and possibly a reciprocal table.

The monitoring and control are carried out in the same way as in Example 1, with the following differences: the computation unit 4020 calculates the position of the image B" of the operating point in the upper half plane. The co-ordinates of the image of the operating point are produced, for example, as rectangular co-ordinates $x_B$, $y_B$, at the output of the computation unit. The output unit indicates the values $x_B$ and $y_B$; in this case, $y_B$ directly indicates the distance between the image of the operating point and the boundary of the upper half plane. If $y_B$ is less than a value $y_W$ defined in advance, then an audible warning signal is emitted. The comparison unit 4030 is supplied with the co-ordinates $x_B$ and $y_B$. The control process is now carried out on the basis of these co-ordinates, the co-ordinates $x_S$ and $y_S$ of the image of the set operating point, and the control line 501, in a similar manner as in Example 3.

EXAMPLE 5

Figure 6:
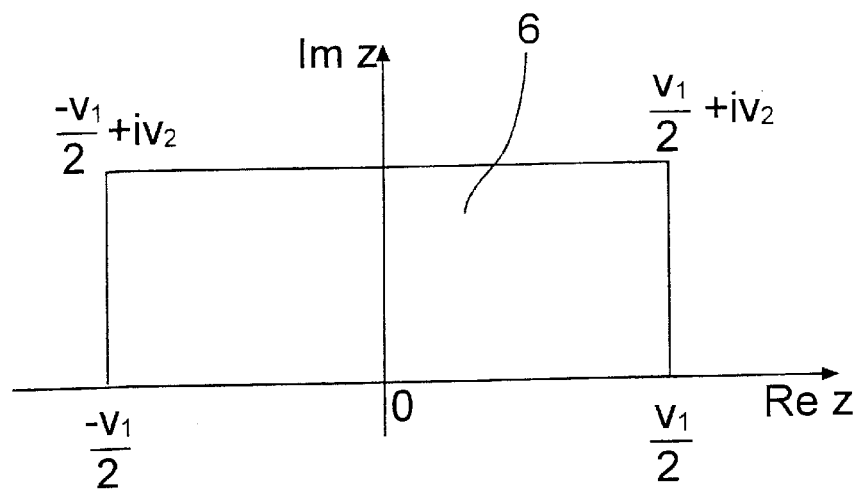
FIG. 6 shows a rectangular operating characteristic.

In this example, an explicit rule for mapping of the characteristic onto the upper half plane is specified for an appliance having a rectangular characteristic (I. N. Bronstein and K. A. Semendjajew, Taschenbuch der Mathematik [Mathematic Manual] 25 Edition, Teubner, Stuttgart 1991). FIG. 6 shows a rectangular characteristic 6. The co-ordinate axes shown are annotated Re z and Im z, and are the real and imaginary axes in the complex number plane. The characteristic 6 has the corners $$\frac{v_1}{2}, -\frac{v_1}{2}, \frac{v_1}{2} + iv_2, -\frac{v_1}{2} + iv_2$$

in this number plane. One such rectangle 6 can be obtained from any given rectangular characteristic by rotation and shifting, for example by multiplication by a complex number whose magnitude is 1, and addition of a complex number.

One function which maps the complex upper $\zeta$ half plane onto the rectangle 6, as shown in FIG. 6, in the z-plane, is the function $$z = c \int_0^\zeta \frac{dt}{\sqrt{(1-t^2)(1-\kappa^2 t^2)}},$$

where c is a real positive constant which depends on the size of the rectangle, and $\kappa$ is a real number between 0 and 1, which depends on the ratio of the side lengths $v_2/v_1$ of the rectangle. (A. Hurwitz and R. Courant, Funktionentheorie, [Function theory] 4th Edition, Springer-Verlag, Berlin, pages 437 et sec). The variables c and $\kappa$ can be calculated numerically for a given rectangle.

The stated function is the reciprocal function of the mapping, according to the method, of the operating envelope into the unit domain. The table of original image and image points quoted in Example 3 above can in this way be produced easily. The points z in the rectangular operating characteristic are determined numerically, using the quoted formula, for a selection of points $\zeta = x + iy$ in the upper half plane. The points z are stored as original image points in the table, and the points $\zeta$ are stored as image points.

EXAMPLE 6

Figure 7:
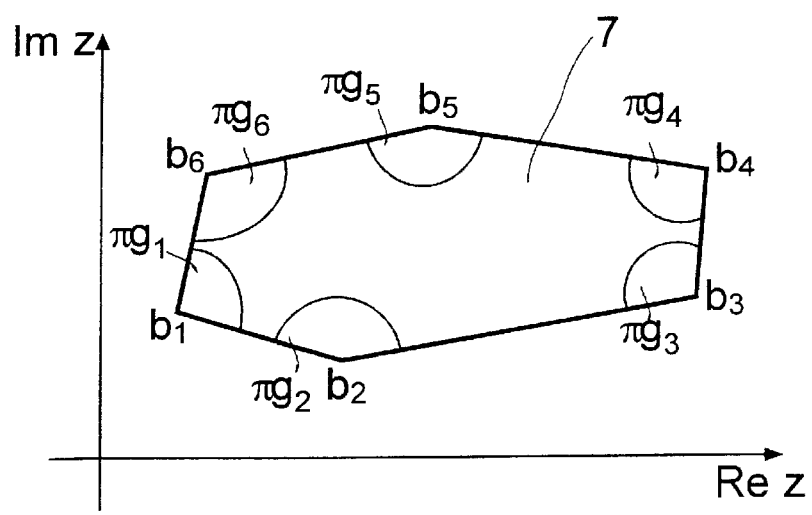
FIG. 7 shows a polygonal operating characteristic.

In this example, Example 5 is generalized to form a general polygonal characteristic. FIG. 7 shows such a characteristic 7, e.g. having six corners $b_1$ to $b_6$. The corners of a general n-sided polygon are annotated $b_1$ to $b_n$, and the angles are annotated $\pi g_1$ to $\pi g_n$. The co-ordinate axes are annotated Re z and Im z, and are the real and imaginary axes of the complex number plane as in the previous Example 5. One function, which maps the complex upper half plane onto a polygon whose angles are $\pi g_1$ to $\pi g_n$, is the Christoffel-Schwarz integral $$z = c_1 \int_0^\zeta (t-a_1)^{g_1-1}(t-a_2)^{g_2-1} \ldots (t-a_n)^{g_n-1} dt + c_2$$

where $c_1$ and $c_2$ are complex constants (Hurwitz and Courant, et al, pages 431 et sec). The real points $a_1$ to $a_n$ are in this case those points which are mapped by this function onto the cornerss of the polygon $b_1$ to $b_n$.

The points $a_1$ to $a_n$ can now be determined using numerical methods for predetermined corners points $b_1$ to $b_n$.

The stated function is the reciprocal function of the mapping according to the method of a polygonal operating characteristic onto the upper half plane as the unit domain. A table of original image and image points can be produced using this, in a similar way to that in Example 5.

EXAMPLE 7

An example of a method for monitoring the operating point of an appliance or of a system comprising a number of appliances having a two-dimensional or multidimensional operating envelope is described in the following text, in which the operating point is monitored in terms of the position of the image of the operating point resulting from a mapping process which maps only a part of the operating envelope onto a unit domain.

Once again, a two-dimensional operating characteristic 2 of any given shape is considered, as shown in FIG. 2. Such a characteristic can be approximated with sufficient accuracy by a polygon with straight edges. In this case, it is advantageous to choose the polygon such that it is entirely located inside the characteristic.

The monitoring of the operating point and the control of an appliance having this characteristic of any given shape can then be carried out on the basis of the position of the image of the operating point resulting in a mapping process which maps the polygon located in the interior of the operating envelope onto the upper half plane. The control process is carried out such that the operating point is within the polygon in all operating conditions. This also ensures that the operating point is in the interior of the actual operating characteristic in all operating conditions.

The advantage of using a polygon to approximate the operating characteristic is that functions which map the upper half plane and a polygon onto one another can be specified in a general analytical form, as in Example 6.

EXAMPLE 8

A method for monitoring an appliance having a two-dimensional operating envelope will be explained in this example, in which the monitoring is carried out on the basis of the position of the image of the operating point which results from a mapping process which maps the operating envelope of the appliance to be controlled onto the operating envelope of another appliance.

In this case, it is assumed that the operating envelope of the appliance to be controlled has, for example, the shape shown in FIG. 2. It is also assumed that another appliance exists, whose operating envelope has, for example, the shape shown in FIG. 6, and that an efficient, safe and reliable control method is known for this appliance. Finally, a transformation $t_1$, which maps the operating characteristic 2 from FIG. 2 onto a unit domain, and a transformation $t_2$, which maps the operating characteristic 6 from FIG. 6 onto the same unit domain, are assumed to be known.

A map of the characteristic 2 onto the characteristic 6 can then be composed of the maps $t_1$ and $t_2$: the desired map is $t_{21} = t_2^{-1} t_1$.

The method for monitoring and controlling the appliance using the operating characteristic 2 can now be carried out as follows: first of all, the operating point of this appliance is determined, and the operating point is mapped into the characteristic 6. The methods (which are assumed to be known) for controlling the appliance by means of the characteristic 6 are now used to determine parameters which define a control action for the appliance with the characteristic 2 to be controlled. This can be done, for example, in the manner described above by inverse transformation of a direction vector, obtained on the basis of these methods, in the characteristic 6 in FIG. 6.

One advantage of this method is that the efficient, safe and reliable control method assumed for the appliance having the characteristic 6 can be applied equally well to an appliance having any given characteristic, such as the characteristic 2. In this way, a control method which is known per se for a specific appliance having a planar characteristic can be used to control any given appliance having a planar characteristic.

We claim:

1. A method for controlling at least one appliance having a first operating range that is multidimensional, said method comprising steps of:

mapping at least a part of the first operating range onto a second operating range of another appliance; and transforming a first operating point in the first operating range by a map to a second operating point in the second operating range of the another appliance for control.

2. The method as claimed in claim 1, wherein at least one process parameter is determined by the map.

3. The method as claimed in claim 1, further comprising:

determining the first operating point in the first operating range;

transforming the first operating point by a stored map rule for the map; and outputting co-ordinates of the second operating point.

4. The method as claimed in claim 1, further comprising:

determining the first operating point in the first operating range;

transforming the first operating point by a stored map rule for the map;

determining parameters which define a control action, based on the co-ordinates of the second operating point; and carrying out the control action.

5. The method as claimed in claim 1, wherein the first operating range is two-dimensional, and wherein the mapping step maps a polygon, which is similar to the first operating range, onto the second operating range of the another appliance.

6. The method as claimed in claim 1, wherein at least one process parameter is determined by an inverse transformation with respect to the map.

7. An apparatus for controlling at least one appliance, each of said at least one appliance having a first operating range that is multidimensional, said apparatus comprising:

means for determining and storing parameters required to produce a map which maps at least part of the first operating range and an operating point in the first operating range into a second operating range of another appliance;

means for producing the map;

means for outputting coordinates of an image of the operating point; and means for carrying out a control action.

8. The apparatus as claimed in claim 7, further comprising means for producing the map for any point in the first operating range.

9. The apparatus as claimed in claim 7, further comprising means for comparing images of two points located in the first operating range, with the comparison being carried out in the second operating range of the another appliance.

10. The apparatus as claimed in claim 7, further comprising means for comparing an image of a point located in the first operating range with at least one line in the second operating range of the another appliance.

11. The apparatus as claimed in claim 7, comprising means for determining at least one process parameter by the map of the first operating range onto the second operating range of the another appliance.

12. The apparatus as claimed in claim 7, further comprising:

a first computation module for transformation of a set point to a transformed set point in the second operating range of the another appliance;

a measuring unit for determining a position of the operating point;

a second computation module for transformation of the operating point to a transformed operating point in the second operating range of the another appliance;

a comparison unit for comparison of the transformed operating point with the transformed set point or with at least one control line of the second operating range;

a monitoring unit for determining parameters required for control; and an execution unit for carrying out operations required for control.

13. A method for controlling at least one appliance having an operating range that is multidimensional, said method comprising steps of:

mapping at least a part of the operating range onto a unit domain; and transforming a first operating point in the operating range by a map to a second operating point in the unit domain for control.

14. The method as claimed in claim 13, wherein at least one process parameter is determined by the map.

15. The method as claimed in claim 13, further comprising:

determining the first operating point in the operating range;

transforming the first operating point by a stored map rule for the map; and outputting co-ordinates of the second operating point.

16. The method as claimed in claim 13, further comprising:

determining the first operating point in the operating range;

transforming the first operating point by a stored map rule for the map;

determining parameters which define a control action, based on the co-ordinates of the second operating point; and carrying out the control action.

17. The method as claimed in claim 13, wherein the operating range is two-dimensional, and wherein the mapping step maps a polygon, which is similar to the operating range, onto the unit domain.

18. The method as claimed in claim 13, wherein at least one process parameter is determined by an inverse transformation with respect to the map.

19. An apparatus for controlling at least one appliance, each of said at least one appliance having a multidimensional operating range, said apparatus comprising:

means for determining and storing parameters required to produce a map which maps at least part of the operating range and an operating point in the operating range into a unit domain;

means for producing the map;

means for outputting coordinates of an image of the operating point; and means for carrying out a control action.

20. The apparatus as claimed in claim 19, further comprising means for producing the map for any point in the operating range.

21. The apparatus as claimed in claim 19, further comprising means for comparing images of two points located in the operating range, with the comparison being carried out in the unit domain.

22. The apparatus as claimed in claim 19, further comprising means for comparing an image of a point located in the operating range with at least one line in the unit domain.

23. The apparatus as claimed in claim 19, further comprising means for determining at least one process parameter by the map of the operating range onto the unit domain.

24. The apparatus as claimed in claim 19, further comprising:

a first computation module for transformation of a set point to a transformed set point in the unit domain;

a measuring unit for determining a position of the operating point;

a second computation module for transformation of the operating point to a transformed operating point in the unit domain;

a comparison unit for comparison of the transformed operating point with the transformed set point or with at least one control line of the unit domain;

a monitoring unit for determining parameters required for control; and an execution unit for carrying out operations required for control.

* * * * *